US009593231B2

(12) United States Patent
Shibata et al.

(10) Patent No.: US 9,593,231 B2
(45) Date of Patent: Mar. 14, 2017

(54) TIRE

(75) Inventors: Tadashi Shibata, Tokyo (JP); Eiji Nakamura, Tokyo (JP); Hirofumi Aoki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1585 days.

(21) Appl. No.: 10/526,466

(22) PCT Filed: Sep. 1, 2003

(86) PCT No.: PCT/JP03/11144

§ 371 (c)(1), (2), (4) Date: Mar. 3, 2005

(87) PCT Pub. No.: WO2004/026954

PCT Pub. Date: Apr. 1, 2004

(65) Prior Publication Data

US 2005/0250883 A1 Nov. 10, 2005

(30) Foreign Application Priority Data

Sep. 3, 2002 (JP) ................................ 2002-257431
Sep. 3, 2002 (JP) ................................ 2002-257432

(51) Int. Cl.

| | |
|---|---|
| ***B60C 1/00*** | (2006.01) |
| ***B60C 11/00*** | (2006.01) |
| ***C08K 5/11*** | (2006.01) |
| ***C08K 3/00*** | (2006.01) |
| ***C08K 5/25*** | (2006.01) |

(52) U.S. Cl.

CPC .................. *C08K 5/11* (2013.01); *B60C 1/00* (2013.01); *B60C 1/0016* (2013.04); *C08K 3/0033* (2013.01); *C08K 5/25* (2013.01); *B60C 11/005* (2013.01); *Y02T 10/862* (2013.01)

(58) Field of Classification Search

CPC ............................ B60C 1/0016; B60C 11/005
USPC .............................. 152/209.5; 524/493, 189
See application file for complete search history.

(56) References Cited

U.S. PATENT DOCUMENTS 3,768,537 A * 10/1973 Hess et al. ................ 152/209.5
3,927,144 A 12/1975 Hayashi et al.
4,675,349 A * 6/1987 Palombo .............. B60C 1/0016 152/209.5
5,225,011 A * 7/1993 Takino et al. ............. 152/209.5
5,534,569 A 7/1996 Etoh
6,103,808 A 8/2000 Hashimoto
2002/0045697 A1* 4/2002 Sohnen et al. ............... 524/492
2002/0049294 A1* 4/2002 Shiina ....................... 526/329.2

FOREIGN PATENT DOCUMENTS

| | | | |
|---|---|---|---|
| EP | 0 478 274 A1 | | 4/1992 |
| EP | 738613 | * | 10/1996 |
| EP | 1026196 A2 | * | 8/2000 |
| EP | 1095972 A1 | * | 5/2001 |
| EP | 1 179 561 A1 | | 2/2002 |
| EP | 1 184 412 A1 | | 3/2002 |
| JP | 04-136048 A | | 5/1992 |
| JP | 05-009338 | * | 1/1993 |
| JP | 05-009338 A | | 1/1993 |
| JP | 09-208748 | * | 8/1997 |
| JP | 09-208748 A | | 8/1997 |
| JP | 2002-146102 A | | 5/2002 |
| JP | 2002-256113 A | * | 9/2002 |
| WO | WO 97/35462 A1 | | 10/1997 |
| WO | 02/38667 A2 | | 5/2002 |
| WO | WO-02/38667 A2 | * | 5/2002 |

OTHER PUBLICATIONS

Science and Technology of Rubber, pp. 432-439, 1994.*
Machine translation for Japan 2002-256113 (no date).*

* cited by examiner

*Primary Examiner* — Steven D Maki
(74) *Attorney, Agent, or Firm* — Sughrue Mion, PLLC

(57) ABSTRACT

The present invention relates to a tire having as a member, a rubber composition comprising (a) 100 mass parts of a rubber component comprising at least one selected from a natural rubber and a diene base synthetic rubber, (b) silica having a nitrogen-absorbing specific surface area (N2SA) of 180 to 270 m2/g and 0.1 to 10.0 mass parts of (c) a partial ester compound of maleic anhydride and a (poly)oxypropylene derivative described above. The tire further comprises as a tread rubber, a rubber composition comprising (A) a rubber component comprising a conjugate diene base rubber, (B) a filler comprising 10 mass % or more of a white filler based on the whole fillers and (C) a partial ester compound of maleic anhydride and a (poly)oxypropylene derivative. This tire has good abrasion resistance, enhanced low heat build-up property, improved processability, excellent driving stability, good physical properties and excellent wet gripping property.

3 Claims, No Drawings

TIRE

BACKGROUND OF THE INVENTION

The present invention relates to a tire, more specifically to a tire which is improved in a processability and a productivity in producing a rubber from a non-vulcanized rubber composition without exerting an adverse effect on the other physical properties of the vulcanized rubber and which is suitably used particularly as a tread rubber.

RELATED ART

In a pneumatic tire for a heavy load which is used for trucks and buses, it has so far been important for enhancing an abrasion resistance and extending a life of a tire that a rigidity of a tread is elevated and the life is inhibited from being reduced by external wounds and that a temperature of a tread rubber is inhibited from being raised by strain which is repeatedly exerted by running.

In general, carbon black/silica used in combination is blended as a reinforcing filler with a tread rubber of a pneumatic tire for a heavy load using a natural rubber such as an isoprene base rubber as a base in order to balance an abrasion resistance with a low heat build-up property at a high level.

However, a tire comprising mainly an isoprene base rubber as a rubber component is liable to be reduced in an elastic modulus and deteriorated in a low heat build-up property, which originate in reversion caused by over-vulcanization. In particular, such undesirable situations as a deterioration in a low heat build-up property as well as a reduction in an abrasion resistance are brought about, as can be seen in an off road tire, in tires of a large size having a tire hump total gauge of 50 mm or more.

In general, rubber products such as tires, belts, hoses and the like are kneaded in order to disperse homogeneously a compounding agent, a filler and the like in a raw material rubber. Also, kneading steps of several times in which a rubber composition is plasticized are further required in a certain case in order to make a molding workability easy in the subsequent processing steps. However, it is not preferred in terms of a productivity of a rubber product to carry out a plasticizing work of several times for a rubber composition as described above. On the other hand, it is effective for enhancing a productivity of a rubber product to decrease a kneading frequency. However, mere decrease in the kneading frequency brings about insufficient plasticization of a non-vulcanized rubber composition and does not result in leading to a rise in the productivity.

Accordingly, it is possible to raise a processability of a non-vulcanized rubber composition, reduce a kneading frequency and enhance a molding workability by adding a plasticizer and a processing aid. However, when using conventional plasticizer and processing aid, a reduction in the physical properties such as an abrasion resistance and a low heat build-up property is brought about, and therefore when applied particularly to a tread rubber of a pneumatic tire for a heavy load to which compatibility between an abrasion resistance and a low heat build-up property is required at a high level, it has been actually difficult to reduce the kneading frequency.

Further, a tread rubber of a pneumatic tire for a heavy load has a high use ratio of a natural rubber, and a kneading frequency has to be raised in a conventional working process in producing rubber products containing a natural rubber since present is a polymer gel produced by entanglement between the molecular chains themselves of the natural rubber and reaction of functional groups themselves in an isoprene chain of the natural rubber or such functional group with a non-rubber component in the natural rubber, so that the productivity has not necessarily been good.

Also, if a kneading frequency is raised in order to plasticize a non-vulcanized rubber composition, a natural rubber molecule is reduced in a molecular weight, and an adverse effect is exerted on the physical properties of the vulcanized rubber composition. Further, when silica is blended as a filler, a deterioration in a factory workability is further brought about because of a poor dispersibility of silica, and performances intrinsically endowed to a natural rubber have not sufficiently been used.

Accordingly, it has so far been desired particularly in the production of natural rubber-containing rubber products to raise a factory workability without bringing about a reduction in the physical properties of a non-vulcanized rubber composition and a vulcanized rubber composition.

Also, in tires for passenger cars, requirement to a driving stability on dry and wet road surfaces grows further high as vehicles sift to a high speed in recent years, and it is required for achieving this to make a tire tread highly elastic. Methods of increasing a filler such as silica and decreasing a plasticizer are known as a conventional technique for achieving this. In this case, however, there used to be the problem that a viscosity of a rubber in non-vulcanization is elevated to markedly reduce the productivity.

On the other hand, several matters were proposed in recent years in order to solve the above problems. It is proposed, for example, to reduce a polymer gel amount in a natural rubber by adding an aromatic polycarboxylic acid derivative to the natural rubber (refer to Japanese Patent Application Laid-Open No. 209406/1999). However, it has been found that blooming is liable to be caused after vulcanization in the above method.

Also, it is known to raise a processability by adding a specific ester (refer to, for example, Japanese Patent Application Laid-Open No. 57040/1994 and Japanese Patent Application Laid-Open No. 20579/1992). In the above methods, however, involved is the problem that a specific odor is produced during processing to cause a problem on a working environment. Further, it is described in European Patent Application Laid-Open No. 1179561 to add an ester of aliphatic polyvalent carboxylic acid and a (poly)oxyalkylene derivative, but it is not described that a tire performance is improved by combination with a specific blending agent.

DISCLOSURE OF THE INVENTION

Under such circumstances, a first object of the present invention is to provide a tire in which an abrasion resistance and a low heat build-up property are enhanced by improving a processability thereof without causing a reduction in the physical properties of a rubber composition and a problem on a working environment and improving a reversion of a natural rubber.

Also, a second object of the present invention is to provide a tire in which a driving stability is compatible with a productivity at a high level by improving a tire tread rubber composition and which is excellent in a wet gripping property.

The present inventors have found that the objects described above are achieved by applying a specific composition containing a partial ester of maleic anhydride and a (poly)oxypropylene derivative to a tire member in a silica-blended rubber composition, and they have come to complete the present invention.

That is, the first present invention provides a tire characterized by using as a member, a rubber composition comprising (a) a rubber component comprising at least one selected from a natural rubber and a diene base synthetic rubber, (b) silica having a nitrogen-absorbing specific surface area ($N_2SA$) of 180 to 270 $m^2/g$ and 0.1 to 10.0 mass parts of (c) a partial ester compound of maleic anhydride and a (poly)oxypropylene derivative per 100 mass parts of the rubber component described above.

Further, the second present invention provides a tire characterized by using as a tread rubber, a rubber composition comprising (A) a rubber component comprising a conjugate diene base rubber, (B) a filler comprising 10 mass % or more of a white filler based on the whole fillers and (C) a partial ester compound of maleic anhydride and a (poly) oxypropylene derivative.

BEST MODE FOR CARRYING OUT THE INVENTION

First, the first present invention (first invention) described above shall be explained.

In the tire of the first invention, a natural rubber and/or a diene base synthetic rubber are used for the rubber component (a), and it comprises preferably a natural rubber. The diene base synthetic rubber includes, for example, an isoprene rubber (IR), a styrene-butadiene rubber (SBR), a polybutadiene rubber (BR), an acrylonitrile-butadiene rubber (NBR), a chloroprene rubber (CR), a butyl rubber (IIR), a butadiene-isoprene copolymer rubber and a butadiene-styrene-isoprene copolymer rubber. They may be used alone or in combination of two or more kinds thereof.

Among them, the natural rubber is added in an amount of preferably 20 mass parts or more, more preferably 50 mass parts or more and further preferably 70 mass parts or more per 100 mass parts of the rubber component. If the amount of the natural rubber is less than 20 mass parts, the heat build-up property tends to be deteriorated.

Further, silica blended as the component (b) described above has a nitrogen-absorbing specific surface area ($N_2SA$) falling in a range of 180 to 270 $m^2/g$. If the above $N_2SA$ is less than 180 $m^2/g$, the abrasion resistance is likely to be unsatisfactory. On the other hand, if the $N_2SA$ exceeds 270 $m^2/g$, it brings about inferior dispersion and causes a marked reduction in the low heat build-up property, the abrasion resistance and the factory workability in a certain case. From the above point of view, the nitrogen-absorbing specific surface area is preferably 205 to 260 $m^2/g$, more preferably 225 to 250 $m^2/g$.

The $N_2SA$ described above is a value measured based on ASTM D4820-93 after dried at 300° C. for one hour.

The above silica includes, for example, wet silica (silicic acid hydrate), dry silica (silicic anhydride), calcium silicate and aluminum silicate, and among them, wet silica is particularly suited.

Silica of the component (b) described above is preferably blended in a range of 2 to 50 mass parts or less per 100 mass parts of the rubber component of the component (a) described above. If the above blending amount exceeds 50 mass parts, a notable deterioration in the workability and a reduction in the fracture characteristic are likely to be brought about. A blending amount of silica falls more preferably in a range of 30 mass parts or less. If it is less than 2 mass parts, the effect of low heat build-up property is small.

Further, the partial ester of maleic anhydride and a (poly) oxypropylene derivative has to be used as the component (c) described above.

The above ester is preferably a compound represented by the following Formula (I):

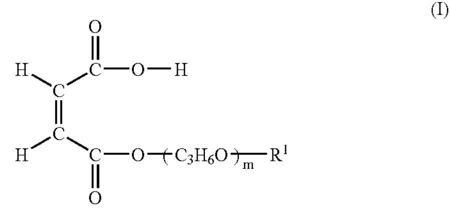

(I)

In Formula (I), m is a number of 1 or more showing an average polymerization degree, and $R^1$ is an alkyl group, an alkenyl group, an alkylaryl group or an acyl group.

In Formula (I) described above, m is more preferably 3 to 7, and $R^1$ is more preferably an alkyl group or an alkenyl group having 8 to 18 carbon atoms.

The partial ester (c) described above is obtained by reacting (i) maleic anhydride with (ii) a (poly)oxypropylene derivative.

The (poly)oxypropylene derivative includes (poly)oxypropylene aliphatic ethers such as polyoxypropylene lauryl ether, polyoxypropylene myristyl ether, polyoxypropylene decyl ether, polyoxypropylene octyl ether, polyoxypropylene 2-ethylhexyl ether, polyoxypropylene stearyl ether and polyoxypropylene oleyl ether; and polyoxypropylene aromatic ethers such as polyoxypropylene benzyl ether, polyoxypropylene alkylphenyl ether and polyoxypropylene benzylated phenyl ether. The polyoxypropylene aliphatic ethers are preferred, and among them, polyoxypropylene lauryl ether is particularly preferred.

Further, it is preferred that polypropylene has a polymerization degree of 3 to 7 and that the alkyl group or the alkenyl group has 8 to 18 carbon atoms. To be specific, it includes POP(3) octyl ether, POP(4) 2-ethylhexyl ether, POP(3) decyl ether, POP(5) decyl ether, POP(3) lauryl ether, POP(5) lauryl ether, POP(8) lauryl ether, POP(1) stearyl ether and POP(5) myristyl ether, wherein polypropylene is abbreviated as POP(r), and r is an average polymerization degree. Among them, the compounds having r of 4 to 7 are preferred.

The (poly)oxypropylene derivatives (ii) may be used alone or in combination of two or more kinds thereof.

The partial ester (c) of maleic anhydride (i) with the (poly)oxypropylene derivative (ii) in the present invention may contain maleic anhydride (i) of the raw material. The above maleic anhydride has a content of preferably 10 mass % or less, particularly preferably 5 mass % or less.

On the other hand, the partial ester (c) of maleic anhydride (i) with the (poly)oxypropylene derivative (ii) may contain the (poly)oxypropylene derivative (ii) of the raw material. The above (poly)oxypropylene derivative (ii) has a content of preferably 40 mass % or less, particularly preferably 20 mass % or less.

The partial ester (c) described above which is used in the present invention includes, to be specific, mono[POP(5) lauryl ether] maleic acid ester, mono[POP(5) myristyl ether] maleic acid ester and mono[POP(5) 2-ethylhexyl ether] maleic acid ester.

A blending amount of the component (c) in the rubber composition used for the tire of the present invention is preferably 0.1 to 10 mass parts per 100 mass parts of the rubber component (a). If it is 0.1 mass part or more, the processability is raised. If it is 10 mass parts or less, the rubber physical properties are maintained, and it is preferred in terms of the cost. From this point of view, it is further preferably 0.5 to 5 mass parts. The above components can be blended, for example, in kneading.

The rubber component (a) used in the rubber composition used for the tire of the present invention has the marked effect of a processability in the system of the natural rubber alone or the blend rubber of the natural rubber and the synthetic rubber. When the rubber component (a) contains the natural rubber, the natural rubber can be reduced in a polymer gel amount without lowering a molecular weight of the natural rubber. Also, the molding workability is enhanced by increasing slip between the rubber molecules, and the non-vulcanized or vulcanized rubber is inhibited from being reduced in physical properties. Further, the silica filler can notably be improved in dispersion.

In any respect, the excellent rubber processability can be obtained without exerting an adverse effect on the physical properties of the vulcanized rubber component.

Further, at least one hydrazide compound selected from naphthoic acid hydrazides and salicylic acid hydrazides is preferably added as the component (d) in the rubber composition used for the tire of the present invention. For example, naphthoic acid hydrazides and salicylic acid hydrazides represented by Formulas (II) and (III) are preferred as the above hydrazide compound from the viewpoint of the performances:

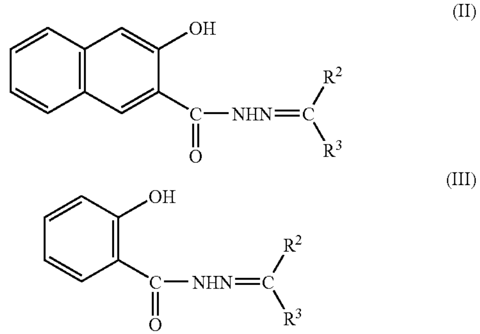

In Formulas (II) and (III), $R^2$ and $R^3$ represent a hydrogen atom or a hydrocarbyl group having 1 to 18 carbon atoms, and they may be the same as or different from each other, or $R^2$ and $R^3$ may be combined with each other to form a cyclic structure. In this case, capable of being given as the hydrocarbyl group having 1 to 18 carbon atoms are a linear or branched alkyl group having 1 to 18 carbon atoms, a linear or branched alkenyl group having 2 to 18 carbon atoms, a cycloalkyl group having 3 to 18 carbon atoms, an aryl group having 6 to 18 carbon atoms and an aralkyl group having 7 to 18 carbon atoms. Suitable substituents such as a lower alkyl group, a lower alkoxyl group, an amino group, an alkyl-substituted amino group and a hydroxyl group may be present on the ring of the cycloalkyl group, the aryl group or the aralkyl group each described above.

The above hydrazide compounds represented by Formulas (II) and (III) described above are, to be specific, particularly preferably 2-hydroxy-N'-(1-methylethylidene)-3-naphthoic acid hydrazide, 2-hydroxy-N'-(1-methylpropylidene)-3-naphthoic acid hydrazide, 2-hydroxy-N'-(1-methylbutylidene)-3-naphthoic acid hydrazide, 2-hydroxy-N'-(1,3-dimethylbutylidene)-3-naphthoic acid hydrazide, 2-hydroxy-N'-(2,6-dimethyl-4-heptylidene)-3-naphthoic acid hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide and N'-(2,6-dimethyl-4-heptylidene)-salicylic acid hydrazide.

Among them, 2-hydroxy-N'-(1,3-dimethylbutylidene)-3-naphthoic acid hydrazide is particularly preferred.

The above hydrazide compound of the component (d) has the actions of inhibiting a reduction in the elastic modulus originating in over-vulcanization of the natural rubber caused by reversion thereof and controlling a reduction in the low heat build-up property and the abrasion resistance.

The hydrazide compound of the component (d) described above may be used alone or in combination of two or more kinds thereof. A blending amount thereof is preferably selected in a range of 0.1 to 5 mass parts per 100 mass parts of the rubber component which is the component (a) described above. If this amount is less than 0.1 mass part, it is likely that the effect of inhibiting a reduction in the elastic modulus is not sufficiently exhibited. On the other hand, if it exceeds 5 mass parts, the effect thereof is not raised in proportion to the amount thereof, and it is economically rather disadvantageous in a certain case. Considering the effect and the economical efficiency, the preferred blending amount of the above component (d) falls in a range of 0.3 to 3 mass parts.

In the rubber composition used for the tire of the first invention, carbon black can be blended as a component (e). Suited as this carbon black is a compound having a nitrogen-absorbing specific surface area ($N_2SA$) falling in a range of 30 to 160 $m^2/g$ and a dibutyl phthalate oil absorption (DBP) falling in a range of 60 to 160 ml/100 g. If the above $N_2SA$ is less than 30 $m^2/g$, the satisfactory abrasion resistance is less liable to be obtained. On the other hand, if the $N_2SA$ exceeds 160 $m^2/g$, it causes a reduction in the low heat build-up property in a certain case. The range described above is preferred from the viewpoint of a balance between the abrasion resistance and the low heat build-up property.

Further, if DBP is less than 60 ml/100 g, the abrasion resistance is less liable to be obtained. On the other hand, if it exceeds 160 ml/100 g, the fatigue resistance is reduced, and the abrasion resistance is likely to be reduced by chipping.

The carbon black of the component (e) is preferably used in a range of 30 to 80 mass parts per 100 mass parts of the rubber component (a). If the above use amount is less than 30 mass parts, it is likely that the abrasion resistance is not sufficiently exhibited. On the other hand, if it exceeds 80 mass parts, the low heat build-up property is reduced, and inferior dispersion is brought about to cause a deterioration in the abrasion resistance. Considering the abrasion resistance, the low heat build-up property and the dispersibility, a blending mount of the above carbon black falls preferably in a range of 30 to 70 mass parts.

The $N_2SA$ is a value measured on the basis of ASTM D3037-88, and the DBP is a value measured on the basis of JIS K6221-1982 (A method).

The carbon black described above shall not specifically be restricted, and optional one suitably selected from those which have so far conventionally been used as a reinforcing filler for a rubber can be used. The examples of the suited carbon black described above are HAF, ISAF and SAF which are excellent in an abrasion resistance.

Further, various chemicals other than those described above which are usually used in the rubber industrial field, for example, an antioxidant, a scorch retarder, zinc oxide, stearic acid and a coupling agent can be added if desired.

The tire of the first present invention is obtained by applying the above rubber composition to a member for a tire. That is, it is obtained by applying the rubber composition obtained in the manner described above to a member for a tire such as a tire tread part (a cap tread and/or an undertread), a carcass, a side wall and a bead part. When it is applied particularly to a tire tread part (a cap tread and/or an undertread) for a heavy load, a tire in which an abrasion resistance and a low heat build-up property are balanced at a high degree can be obtained. Further, it is preferably applied to an off road tire.

Next, the second present invention (second invention) described above shall be explained.

In the tire of the second invention, the kind of the component (A) shall not specifically be restricted as long as it contains at least a conjugate diene base rubber. The natural rubber and the conjugate diene base synthetic rubber as the component (a) can be applied as the conjugate diene base rubber. Among them, the styrene-butadiene copolymer rubber is preferred, and a preferred content of the above rubber in the rubber component is 10 mass % or more, particularly preferably 30 to 100 mass %.

Also, the partial ester compound of maleic anhydride and a (poly)oxypropylene derivative used as the partial ester (C) is the same as the case of the component (c).

Further, an amount of the filler as the component (B) is preferably 30 to 150 mass parts per 100 mass parts of the rubber component. Further, in the present invention, a white filler of 10 mass % or more based on the whole amount of the filler (B) has to be added. Compatibility between the driving stability, the wet gripping property and the rubber processability (productivity) can be achieved by using the filler containing the white filler falling in the range described above. From the above point of view, 30 mass % or more of the white filler is particularly preferably added.

The above white filler shall by no means be restricted as long as it has so far been used in the rubber industry, and it can be selected from, for example, silica, alumina, aluminum hydroxide, clay, mica and calcium carbonate. They can be used alone or in combination of two or more kinds thereof. Among them, silica and aluminum hydroxide are preferred. In particular, silica having a nitrogen-absorbing specific surface area ($N_2SA$) of 180 to 300 $m^2/g$ is preferred, and silica having a $N_2SA$ of 205 to 260 $m^2/g$ is more preferred. Such silica includes, for example, Nipseal AQ ($N_2SA$: 210 $m^2/g$, manufactured by Nippon Silica Ind. Co., Ltd.) and Nipseal VN3 ($N_2SA$: 200 $m^2/g$, manufactured by Nippon Silica Ind. Co., Ltd.).

Further, aluminum hydroxide having a $N_2SA$ falling in a range of 1 to 20 $m^2/g$ is preferred and includes Higilite 43M ⌈brand name⌋ (manufactured by Showa Denko Co., Ltd.).

On the other hand, carbon black is usually used as a filler other than the white filler. The kind of carbon black shall not specifically be restricted, and preferred is carbon black having an iodine absorption (IA) of 60 mg/g or more and a dibutyl phthalate oil absorption (DBP) of 80 ml/100 g or more. The gripping performance and the fracture resistance can be improved by using such carbon black for a tread rubber. Further, when the excellent abrasion resistance is required, HAF, ISAF and SAF are preferably used.

In the tread rubber composition described above, a silane coupling agent can be blended if desired. This silane coupling agent shall not specifically be restricted, and capable of being used are publicly known compounds which have so far been used for a rubber composition, for example, bis(3-triethoxysilylpropyl) polysulfide, γ-mercaptopropyl-triethoxysilane, γ-aminopropyltriethoxysilane, N-phenyl-γ-aminopropyltrimethoxysilane and N-β-(aminoethyl)-γ-aminopropyltrimethoxysilane. A blending amount of the above silane coupling agent is selected in a range of usually 1 to 20% by weight based on the filler described above.

Any ones can be used as the vulcanizing agent and the vulcanization accelerator used in the present invention as long as they are usually used in the rubber industry. In particular, used are vulcanization accelerator such as bis(4-methylbenzothiazolyl-2) disulfide, bis(4-methylbenzothiazolyl-2) disulfide, bis(5-methylbenzothiazolyl-2) disulfide, mercapto-4-benzothiazole and mercapto-5-benzothiazole which are described in Japanese Patent Application Laid-Open No. 77365/1998 and antimony dithionate described in Japanese Patent Application Laid-Open No. 251449/1998, whereby the tire having an excellent tread heat resistance can be produced at a good productivity.

Any ones can be used as a softening agent as long as they are process oils usually used in the rubber industry. Preferably added is an oil in which a dimethyl sulfoxide (DMSO) extract measured by an IP346 method is controlled to less than 3 mass %. They may be hydrogenated naphthenic oils obtained by subjecting naphthenic oils to hydrogenation treatment at a high temperature and a high pressure and may be a mixture of a naphthenic oil and a straight asphalt.

The above oil having a DMSO extract amount of less than 3 mass % includes, for example, treated distilled extracts (T-DAE) and mild extracted solvates (MES) which are obtained by treating high aromatic oils produced with petroleum used as a raw material.

Further, petroleum base resins having a softening point of 30 to 150° C. are preferred as a softening agent component since they have an action of enhancing the effects of the present invention. Preferably used are, for example, resins such as Escorez (manufactured by Tonex Co., Ltd.), Struktol TS30 (manufactured by Struktol Co., Ltd.), Quintone (manufactured by Nippon Zeon Co., Ltd.), Neo Polymer (manufactured by Nippon Petroleum Co., Ltd.) and Koresin (manufactured by BASF Co., Ltd.).

Further, when they are used in combination with α-olefin base resins such as polyethylene and polypropylene, the driving stability can further be raised. The above resins may be chemically modified, and to be specific, Novatec (manufactured by Polychem Co., Ltd.) is given.

The tire of the second present invention is obtained by applying the above rubber composition to a tread. This tire is effective particularly as a tire for passenger cars.

As described above, the tire according to the present invention can raise a tire performance without exerting an adverse effect on rubber physical properties, and in addition thereto, the above rubber composition has a good factory workability and therefore is excellent as well in a productivity.

Further, the tire according to the present invention can be a tire for a heavy load, and the tire for a heavy load can be an off-road tire.

Air which is ordinary or changed in an oxygen partial pressure or inert gas such as nitrogen can be charged and used as gas charged into the tire.

Next, the present invention shall be explained in further details with reference to examples, but the present invention shall by no means be restricted by these examples.

Various measurements were carried out by the following methods.

(1) Mooney Viscosity ($ML_{1+4}$)

In order to evaluate a processability of the rubber composition, a non-vulcanized rubber sample obtained by adding and kneading a vulcanization blending agent was preheated at 130° C. for one minute, and then a rotor was started rotating to measure a value after 4 minutes by means of Moony Viscometer SMV201 manufactured by Shimadzu Corporation, whereby $ML_{1+4}$ was determined. It is shown that the smaller the value, the better the processability.

(2) Heat Build-Up Property

A prescribed weight was allowed to freely fall on a rubber surface to determine a value of a height (% based on the falling height) to which the weight jumped. The test method and the value of the result are based on JIS K6301-1995. The results were shown by an index, wherein the value of Comparative Example 2 was set to 100. It is shown that the larger the value, the larger the low heat build-up property.

(3) Abrasion Resistance

An abrasion loss was measured based on JIS K6264-1993 by a Lamborn abrasion test. The results were shown by an index of a reverse number of the abrasion loss in the respective examples, wherein the value of Comparative Example 2 was set as a basis in Examples 1 to 9 and Comparative Examples 1 to 6, and the value of Comparative Example 7 was set as a basis in Examples 10 to 16 and Comparative Examples 7 to 12; and a reverse number of the abrasion loss obtained in each basis was set to 100. The larger the value, the better the abrasion resistance.

(4) Dynamic Viscoelasticity and Driving Stability

Measurement was carried out at each temperature on the condition of 50 Hz and a strain of 0.5% by means of a spectrometer manufactured by Toyo Seiki Seisaku-sho, Ltd. to determine a dynamic storage elastic modulus (E') at 50° C. In the evaluation of the driving stability, a score in running of a car was calculated from the above dynamic storage elastic modulus and shown by an index, wherein the value of Comparative Example 7 was set to 100. The larger the value, the better the driving stability.

(5) Wet Gripping Property

Measured at a room temperature by means of a British portable skid tester (BPST) and shown by an index, wherein the value of Comparative Example 7 was set to 100. The larger the value, the better the wet gripping property.

Examples 1 to 9 and Comparative Examples 1 to 6

The respective compositions were kneaded by means of a Banbury mixer based on blend compositions shown in Table 1.

TABLE 1

| Rubber composition blended | | Comparative Example | | | | | |
|---|---|---|---|---|---|---|---|
| (mass part) | | 1 | 2 | 3 | 4 | 5 | 6 |
| Polymer | Natural rubber | 100 | 100 | 100 | 100 | 70 | 100 |
| mass part | SBR*1 | — | — | — | — | — | — |
| | BR*2 | — | — | — | — | 30 | — |
| Silica*3 | mass part | 10 | — | — | 20 | 10 | 5 |
| | ($N_2SA$) | (235) | — | — | (235) | (210) | (210) |
| | (DPB) | (250) | — | — | (250) | (210) | (210) |
| Carbon | mass part | 40 | 50 | 45 | 50 | 40 | 40 |
| | ($N_2SA$) | (110) | (140) | (140) | (140) | (145) | (110) |
| | (DPB) | (100) | (90) | (90) | (90) | (110) | (100) |
| Ester compound*4 | | — | — | — | — | — | — |
| Antioxidant 6C*5 | | 1 | 1 | 1 | 1 | 1 | 1 |
| Stearic acid | | 2 | 2 | 2 | 2 | 2 | 2 |
| Wax*6 | | 2 | 2 | 2 | 2 | 2 | 2 |
| Zinc oxide | | 3 | 3 | 3 | 3 | 3 | 3 |
| Vulcanization accelerator CZ*7 | | 1.5 | 1 | 1 | 1.5 | 1.8 | 1.5 |
| Sulfur | | 1.7 | 1.5 | 1.5 | 1.7 | 1.5 | 1.7 |
| Coupling agent*8 | | — | — | — | — | — | — |
| Hydrazide compound*9 | | — | — | — | — | — | — |
| Result: | Moony viscosity ($ML_{1+4}$) | 106 | 105 | 105 | 120 | 115 | 98 |
| | heat build-up property (index) | 101 | 100 | 98 | 92 | 105 | 105 |
| | Abrasion resistance (index) | 105 | 100 | 98 | 95 | 120 | 98 |

| Rubber composition blended | | Example | | | | | | | | |
|---|---|---|---|---|---|---|---|---|---|---|
| (mass part) | | 1 | 2 | 3 | 4 | 5 | 6 | 7 | 8 | 9 |
| Polymer | Natural rubber | 100 | 100 | 100 | 70 | 100 | 100 | 100 | 70 | 100 |
| mass part | SBR*1 | — | — | — | 30 | — | — | — | — | — |
| | BR*2 | — | — | — | — | — | — | — | 30 | — |
| Silica*3 | mass part | 10 | 10 | 10 | 10 | 10 | 10 | 20 | 10 | 5 |
| | ($N_2SA$) | (235) | (235) | (235) | (235) | (235) | (235) | (235) | (210) | (210) |
| | (DPB) | (250) | (250) | (250) | (250) | (250) | (250) | (250) | (210) | (210) |
| Carbon | mass part | 40 | 40 | 40 | 40 | 50 | 50 | 40 | 40 | 40 |
| | ($N_2SA$) | (110) | (110) | (110) | (110) | (140) | (140) | (140) | (145) | (110) |
| | (DPB) | (100) | (100) | (100) | (100) | (90) | (90) | (90) | (110) | (100) |
| Ester compound*4 | | 0.5 | 1 | 3 | 1 | 0.7 | 0.7 | 1.5 | 0.5 | 0.5 |
| Antioxidant 6C*5 | | 1 | 1 | 1 | 1 | 1 | 1 | 1 | 1 | 1 |
| Stearic acid | | 2 | 2 | 2 | 2 | 2 | 2 | 2 | 2 | 2 |
| Wax*6 | | 2 | 2 | 2 | 2 | 2 | 2 | 2 | 2 | 2 |
| Zinc oxide | | 3 | 3 | 3 | 3 | 3 | 3 | 3 | 3 | 3 |
| Vulcanization accelerator CZ*7 | | 1.5 | 1.4 | 0.8 | 1.8 | 1.5 | 1.5 | 1.8 | 1.8 | 1.5 |
| Sulfur | | 1.7 | 1.3 | 1.3 | 1.8 | 1.7 | 1.7 | 1.8 | 1.5 | 1.7 |

TABLE 1-continued

| | | | | | | | | | | |
|---|---|---|---|---|---|---|---|---|---|---|
| Coupling agent*8 | | — | — | — | — | — | — | — | — | — |
| Hydrazide compound*9 | | — | 0.5 | 1.5 | 0.5 | 0.7 | 1.7 | 0.8 | 0.5 | 0.5 |
| Result: | Moony viscosity ($ML_{1+4}$) | 95 | 91 | 88 | 85 | 100 | 99 | 105 | 102 | 90 |
| | heat build-up property (index) | 101 | 105 | 110 | 100 | 100 | 102 | 105 | 112 | 105 |
| | Abrasion resistance (index) | 110 | 110 | 110 | 105 | 115 | 114 | 112 | 120 | 104 |

Remarks:

*1 SBR: emulsion-polymerized SBR, brand name ⌈JSR #1500⌋, manufactured by JSR Co., Ltd.

*2 BR: polybutadiene rubber, brand name ⌈150L⌋, manufactured by Ube Kosan Co., Ltd.

*3 Silica (kind 1): Nipseal AQ ($N_2SA$: 210 $m^2/g$, manufactured by Nippon Silica Ind. Co., Ltd.)
Silica (kind 2): Nipseal KQ ($N_2SA$: 235 $m^2/g$, manufactured by Nippon Silica Ind. Co., Ltd.).

*4 Ester compound: mono[POP(5) lauryl ether] maleic acid ester

*5 Antioxidant 6C: N-phenyl-N'-(1,3-dimethylbutyl)-p-phenylenediamine

*6 Wax: brand name ⌈WMO2⌋, manufactured by Seiko Chemical Co., Ltd.

*7 Vulcanization accelerator CZ: N-cyclohexyl-2-benzothiazylsulfeneamide

*8 Coupling agent: brand name ⌈Si 69⌋, manufactured by Degussa Co., Ltd.

*9 Hydrazide compound: 2-hydroxy-N'-(1,3-dimethylbutylidene)-3-naphthoic acid hydrazide The non-vulcanized rubber compositions obtained above were measured for a Moony viscosity. Vulcanized rubber compositions obtained by vulcanizing the above non-vulcanized rubber compositions at 150° C. for 30 minutes were evaluated for a heat build-up property and an abrasion resistance by the methods described above. The results thereof are shown in Table 1.

It can be found from the above results that any of the rubber compositions according to the present invention allows the non-vulcanized rubbers to be notably excellent in a processability and allows the vulcanized rubbers to be improved in a heat build-up property and an abrasion resistance.

As can be found from the results shown in Table 1, the non-vulcanized rubbers are improved in a workability by the compositions containing the ester compound (c), and the vulcanized rubbers are improved in an abrasion resistance while maintaining a heat build-up property.

Further, it can be found that the non-vulcanized rubbers are improved as well in a workability by the compositions containing the ester compound (c) and the hydrazide compound (d) and the vulcanized rubbers are improved in a heat build-up property and an abrasion resistance and that a balance between both is secured at a high level.

Examples 10 to 16 and Comparative Examples 7 to 12

According to compositions shown in Table 2, 137.5 mass parts of a styrene-butadiene copolymer rubber (SBR 1712), each prescribed amount of various fillers, mono[POP(5) lauryl ether] maleic acid ester, a silane coupling agent and a resin, 1 mass part of stearic acid and 1 mass part of an antioxidant 6C [N-phenyl-N'-(1,3-dimethylbutyl)-p-phenylenediamine] were kneaded at a start temperature set to 70° C. and a revolution of 70 rpm for 4 minutes by means of a Banbury mixer.

The mixture thus obtained was left sufficiently cooled down to a room temperature, and then 3 mass parts of zinc oxide, 1 mass part of a vulcanization accelerator DM (dibenzothiazyl disulfide), 1 mass part of a vulcanization accelerator CZ (N-cyclohexyl-2-benzothiazylsulfeneamide) and 2 mass parts of sulfur were further added and kneaded at a start temperature set to 70° C. and a revolution of 70 rpm for 1 minute by means of the Banbury mixer. The ester additive was not used in Comparative Examples 7 to 12.

The non-vulcanized rubber compositions obtained above were evaluated for a Moony viscosity, and the vulcanized rubber compositions were evaluated for a dynamic storage elastic modulus (E'), a driving stability, a wet gripping property and an abrasion resistance by the methods described above. The results thereof are shown in Table 2.

TABLE 2

| Rubber composition blended | | Example | | | | | | |
|---|---|---|---|---|---|---|---|---|
| (mass part) | | 10 | 11 | 12 | 13 | 14 | 15 | 16 |
| Rubber component: | SBR (oil extended)*10 | 137.5 | 137.5 | 96.25 | 137.5 | 137.5 | 137.5 | 96.25 |
| | butadiene rubber*11 | — | — | 30 | — | — | — | — |
| | natural rubber | — | — | — | — | — | — | 30 |
| Filler: | carbon black*12 | 35 | 45 | 45 | 45 | 45 | 45 | 45 |
| | silica*13 | 35 | 45 | 45 | 45 | 45 | 45 | 45 |
| | aluminum hydroxide*14 | — | — | — | 10 | 10 | 10 | — |
| Partial ester*15 | | 1 | 1.5 | 1.5 | 1.5 | 1.5 | 1.5 | 1.5 |
| Silane coupling agent*16 | | 3.5 | 4.5 | 4.5 | 4.5 | 4.5 | 4.5 | 4.5 |
| Resin: | resin A*17 | — | — | — | — | 5 | 5 | — |
| | resin B*18 | — | — | — | — | — | 5 | — |
| (Mass % of silica in the filler) | | 50 | 50 | 50 | 45 | 45 | 45 | 50 |
| (Total oil amount) | | 37.5 | 37.5 | 37.5 | 37.5 | 37.5 | 37.5 | 37.5 |
| Evaluation results: | | | | | | | | |
| Moony viscosity ($ML_{1+4}$) | | 49 | 69 | 62 | 63 | 60 | 61 | 64 |
| Dynamic storage elastic modulus E' (MPa) | | 10.0 | 14.4 | 13.2 | 14.9 | 15.6 | 17.0 | 13.0 |
| Driving stability (index) | | 97 | 108 | 103 | 110 | 112 | 116 | 103 |
| Wet gripping property (index) | | 110 | 110 | 105 | 119 | 121 | 121 | 104 |

TABLE 2-continued

| Abrasion resistance (index) | 103 | 92 | 101 | 90 | 90 | 91 | 105 |
|---|---|---|---|---|---|---|---|

| Rubber composition blended | | Comparative Example | | | | | |
|---|---|---|---|---|---|---|---|
| (mass part) | | 7 | 8 | 9 | 10 | 11 | 12 |
| Rubber component: | SBR (oil extended)*10 | 137.5 | 137.5 | 137.5 | 95.25 | 96.25 | 96.25 |
| | butadiene rubber*11 | — | — | — | — | 30 | — |
| | natural rubber | — | — | — | — | — | 30 |
| Filler: | carbon black*12 | 70 | 90 | 35 | 45 | 45 | 45 |
| | silica*13 | — | — | 35 | 45 | 45 | 45 |
| | aluminum hydroxide*14 | — | — | — | — | — | — |
| Partial ester*15 | | — | — | — | — | — | — |
| Silane coupling agent*16 | | — | — | 3.5 | 4.5 | 4.5 | 4.5 |
| Resin: | resin A*17 | — | — | — | — | — | — |
| | resin B*18 | — | — | — | — | — | — |
| (Mass % of silica in the filler) | | — | — | 50 | 50 | 50 | 50 |
| (Total oil amount) | | 37.5 | 37.5 | 37.5 | 37.5 | 37.5 | 37.5 |
| Evaluation results: | | | | | | | |
| Moony viscosity ($ML_{1+4}$) | | 55 | 93 | 58 | 89 | 75 | 81 |
| Dynamic storage elastic modulus E' (MPa) | | 11.0 | 15.0 | 10.0 | 14.5 | 13.0 | 13.1 |
| Driving stability (index) | | 100 | 110 | 97 | 108 | 103 | 103 |
| Wet gripping property (index) | | 100 | 101 | 109 | 110 | 105 | 103 |
| Abrasion resistance (index) | | 100 | 90 | 102 | 93 | 100 | 105 |

Remarks:

*10 SBR (oil extended): SBR 1712 ⌈brand name⌋ (oil-extended rubber containing 37.5 mass parts of an aromatic oil per 100 mass parts of rubber component, manufactured by JSR Co., Ltd.)

*11 Butadiene rubber: BR01 ⌈brand name⌋ (cis-1,4-polybutadiene, manufactured by JSR Co., Ltd.)

*12 Carbon black: SAF grade (manufactured by Tokai Carbon Co., Ltd.)

*13 Silica: Nipseal AQ ($N_2SA$: 210 $m^2/g$, manufactured by Nippon Silica Ind. Co., Ltd.)

*14 Aluminum hydroxide: Higilite 43M ⌈brand name⌋ (manufactured by Showa Denko Co., Ltd.)

*15 Partial ester: mono[POP(5) lauryl ether] maleic acid ester

*16 Silane coupling agent: Si 69 ⌈brand name⌋ (manufactured by Degussa Co., Ltd.)

*17 Resin A: $C_5$ base petroleum resin (manufactured by Struktol Co., Ltd.)

*18 Resin B: Novatec ⌈brand name⌋ (polyethylene base resin, manufactured by Japan Polychem Corp.)

As can be seen from the results described above, the driving stability can be enhanced by increasing an amount of the filler in Comparative Examples 7 and 8 and Comparative Examples 9 and 10, but the non-vulcanized rubbers are notably increased in a viscosity, and this shows that it is difficult to stably produce the tire.

In contrast with this, it can be found that in Examples 10 and 11 (carbon black and silica were used in combination for the filler) in which the partial ester is used according to the present invention, the non-vulcanized rubbers are inhibited from being increased in a viscosity and that both of the driving stability and the wet gripping property can notably be raised without exerting an adverse effect on the productivity.

Further, in comparison of Example 11 with Examples 13 to 15, when three compounds of carbon black, silica and aluminum hydroxide are used in combination for the filler, the effects described above grow large further more, and particularly in Examples 14 and 15 in which the petroleum resin and the α-olefin resin are used, it is observed that compatibility between the productivity, the driving stability and the wet gripping property can be achieved at a higher level.

In all of Examples 12 and 16 and Comparative Examples 11 and 12, a blend rubber of SBR and the butadiene rubber or the natural rubber is blended, and it is observed that also in the above cases, all performances of the driving stability, the wet gripping property and the abrasion resistance are raised with a good balance in the examples of the present invention while inhibiting the non-vulcanized rubber from rising in a viscosity.

INDUSTRIAL APPLICABILITY

According to the present invention, capable of being obtained is a tire (particularly a tire for a heavy load) in which an abrasion resistance and a low heat build-up property are balanced to a high degree while improving a processability thereof without causing a reduction in the physical properties of a rubber composition. Further, capable of being obtained is a tire (particularly a tire for a passenger car) which is excellent in a wet gripping property while allowing a productivity to be compatible with a driving stability at a high level.

What is claimed is:

1. An off-road tire characterized by using as a tread rubber, a rubber composition comprising (A) a rubber component comprising a conjugate diene base rubber, (B) a filler comprising 10 mass % or more of silica based on the total amount of filler, (C) a partial ester compound selected from the group consisting of mono[POP(5) lauryl ether] maleic acid ester, mono[POP(5) myristyl ether] maleic acid ester and mono[POP(5) 2-ethylhexyl ether] maleic acid ester, and (D) a petroleum base resin having a softening point of 30 to 150° C. and an α-olefin base resin, wherein the conjugate diene base rubber comprises at least a styrene-butadiene copolymer rubber.

2. The tire as described in claim 1, wherein a blending amount of the filler as the component (B) is 30 to 150 mass parts per 100 mass parts of the rubber component.

3. The tire as described in claim 1, wherein the rubber composition described above further comprises a softening agent comprising an oil in which a dimethyl sulfoxide (DMSO) extract amount measured by an IP346 method is controlled to less than 3 mass %.

* * * * *